(12) United States Patent
Chen et al.

(10) Patent No.: US 7,875,814 B2
(45) Date of Patent: Jan. 25, 2011

(54) ELECTROMAGNETIC DIGITIZER SENSOR ARRAY STRUCTURE

(75) Inventors: Dinguo Chen, Taipei (TW); Yingchih Lee, Shengan Township (TW)

(73) Assignee: TPO Displays Corp., Chu-Nan (TW)

( * ) Notice: Subject to any disclaimer, the term of this patent is extended or adjusted under 35 U.S.C. 154(b) by 1222 days.

(21) Appl. No.: 11/490,834

(22) Filed: Jul. 21, 2006

(65) Prior Publication Data

US 2007/0018076 A1    Jan. 25, 2007

Related U.S. Application Data

(60) Provisional application No. 60/701,160, filed on Jul. 21, 2005, provisional application No. 60/701,297, filed on Jul. 21, 2005.

(51) Int. Cl.
*G06F 3/046* (2006.01)
*G06F 3/041* (2006.01)

(52) U.S. Cl. ............... 178/18.07; 178/18.01; 178/18.08; 345/173

(58) Field of Classification Search ......... 345/173–179; 178/18.01–20.04
See application file for complete search history.

(56) References Cited

U.S. PATENT DOCUMENTS

| | | | | |
|---|---|---|---|---|
| 4,672,155 A | * | 6/1987 | Naruse | 178/18.07 |
| 4,859,813 A | * | 8/1989 | Rockwell | 178/18.03 |
| 5,136,125 A | * | 8/1992 | Russell | 178/18.07 |
| 5,214,427 A | * | 5/1993 | Yano | 341/20 |
| 2005/0133279 A1 | | 6/2005 | Thacker | |

FOREIGN PATENT DOCUMENTS

CN    2480920    3/2002

* cited by examiner

*Primary Examiner*—Sumati Lefkowitz
*Assistant Examiner*—Jonathan Horner
(74) *Attorney, Agent, or Firm*—Liu & Liu

(57) ABSTRACT

An electromagnetic digitizer having a sensor segment that includes a generally longitudinal network of conductive lines. Two or more conductive lines are coupled in parallel. To enhance sensitivity, the adjacent lines are interconnected along the longitudinal structure, using interconnections in the form of short lines, oriented at an angle. The sensor segments may be miniaturized, to facilitate integration into a display module using semiconductor fabrication processes. Various sensor array structures may be implemented using the sensor segment structures. The sensor array may include longitudinal sensor segments arranged in a parallel array. To further enhancing sensitivity of the sensor array, additional lines may be provided between adjacent longitudinal sensor segments. The sensor array may also include half loop (or U-shaped) sensor segments arranged in an overlapping parallel array, or full loop sensor segments arranged in an overlapping parallel array.

20 Claims, 7 Drawing Sheets

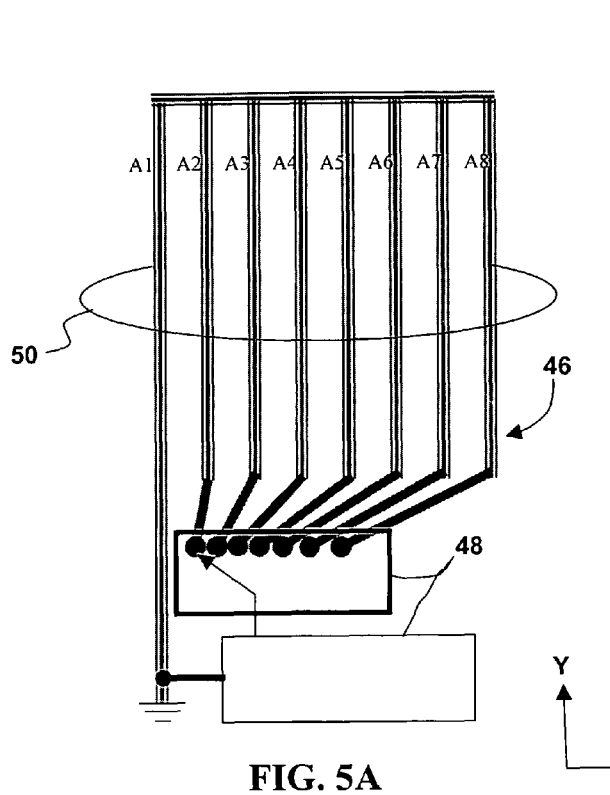
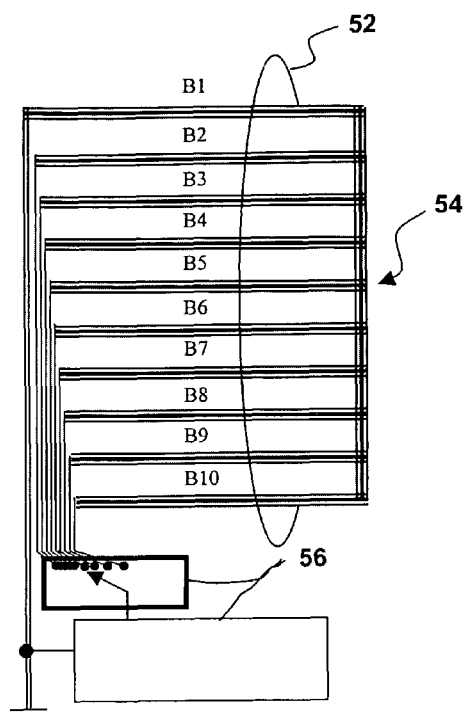
FIG. 5A
FIG. 5B
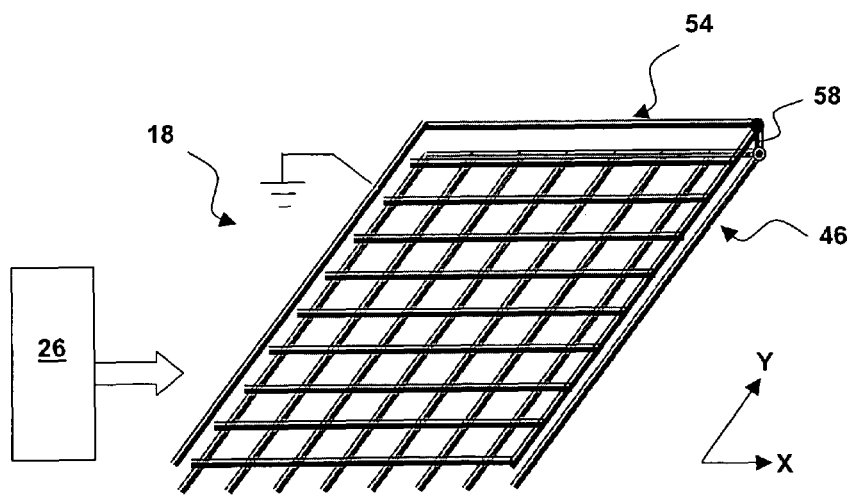
FIG. 5C

FIG. 8A     FIG. 8B

US 7,875,814 B2

ELECTROMAGNETIC DIGITIZER SENSOR ARRAY STRUCTURE

This application claims the benefits of the priority of Provisional Patent Application No. 60/701,160, which was filed Jul. 21, 2005, and the priority of Provisional Patent Application No. 60/701,297, which was filed Jul. 21, 2005. These provisional applications are fully incorporated by reference, as if fully set forth herein. All other publications and U.S. patent applications disclosed herein below are also incorporated by reference, as if fully set forth herein.

BACKGROUND OF THE INVENTION

1. Field of the Invention

The present invention relates generally to flat panel displays, and particularly to a two-dimensional position-detecting user input device, and more particularly to an electromagnetic digitizer for a flat panel display.

2. Description of Related Art

Flat panel displays, such as liquid crystal displays (LCD), are becoming ubiquitous for displaying images. One type of LCD is provided with a two-dimensional position-detecting user input device (i.e., a digitizer) to allow user input, such as user interactivity with respect to images displayed (e.g., selecting an icon), handwriting recognition, drawing, cursor control, etc. This type of LCD is often referred to as a "touch panel" LCD. The digitizer may be based on sensing mechanisms such as resistive sensing, capacitive sensing, infrared sensing, acoustic wave sensing, force sensing, electromagnetic sensing, etc.

For an electromagnetic touch panel, the underlying operational principle is magnetic induction. There are three main components for magnetic inductive input, including a two dimensional sensor array, an electromagnetic pen, and a controller operatively coupled to the sensor array and the electromagnetic pen. The electromagnetic pen acts as a signal transceiver, the sensor array acts as a signal receiver, and the controller determines the two-dimensional coordinates of the pen with respect to the sensor array by detecting the current change as a result of magnetic induction in the sensor array caused by a change in magnetic flux brought about by the pen. As a result, as the pen is moved about with respect to the sensor array, the two-dimensional coordinates of the pen (i.e., X-Y coordinates) relative to the display surface can be determined by the controller. Electromagnetic digitizers provide relatively accurate position detection of the pen, in relatively good resolution compared to some of the other forms of sensing mechanisms.

Heretofore electromagnetic digitizers have been implemented in a flat panel display by simply by assembling a discrete digitizer module with a display module. FIG. 1 schematically illustrates a conventional flat panel display 500 having a flat panel display module 502 (e.g., an LCD module) and a separate electromagnetic digitizer board 504 assembled in a stack. For example, the digitizer board 504 is attached to one planar surface of the display module 502. A controller 508 is operatively coupled to the digitizer board 504 and a complementary electromagnetic pen 506. The digitizer board 504 includes a sensor array, which is formed by conventional printed circuit technology, with sensor array structures fabricated by printing technology. Printed circuit technology involves relatively large physical sizes and low resolution, as compared to semiconductor circuit fabrication technology. The sensor array includes metal conductive lines with a line width on the order of several hundred micrometers, as compared to semiconductor fabrication technology, involving line width on the order of micrometers. To achieve the desired sensitivity, the physical dimension of the sensor array tends to be relatively bulky. Further, given that the conventional electromagnetic digitizer board 504 is a separate and discrete component attached to the display module 502, it adds to the thickness and weight of the overall flat panel display 500.

It is therefore desirable to design and develop an electromagnetic digitizer that can be implemented in a relatively low form factor in a flat panel display, with improved sensitivity.

SUMMARY OF THE INVENTION

The present invention overcomes the drawback of the prior art electromagnetic digitizers by providing a novel structure for the sensor segments in the sensor array. The sensor segment structure may be adapted to configure sensor arrays that can be integrated into the display module of a display device (e.g., an LCD module of an LCD device).

In one aspect of the present invention, a sensor segment comprises a generally longitudinal structure that includes a two-dimensional network of conductive lines, traces or wires. In one embodiment, two or more conductive traces are structured in parallel. The number of parallel traces depends on the signal sensitivity desired. To further enhance the sensitivity to induced magnetic signals, the adjacent traces are interconnected at one or more locations along the longitudinal structure. The interconnections may be in the form of short traces, oriented at an angle between adjacent parallel traces. All the interconnections between two adjacent longitudinal traces may be at the same angle, and interconnections between different adjacent longitudinal traces may be at different angles. The width of the conductive structures in the sensor segments has a dimension on the order ranging from less than one micrometer, to several hundred micrometers.

In another aspect of the present invention, the sensor segments are miniaturized, so that they can be integrated into the display module using semiconductor fabrication processes (i.e., formed into one or more layers within the display module, as opposed to attached to the outside of the display module as practiced in the prior art).

In another aspect of the present invention, various sensor array structures are provided to take advantage of the novel sensor segment structures. In one embodiment, the sensor array comprises longitudinal sensor segments arranged in a parallel array. To further enhancing sensitivity of the sensor array, additional lines may be provided between adjacent longitudinal sensor segments, which additional lines may be at the same voltage potential (e.g., connected to a fixed reference voltage or ground), or electrically isolated or floating. In another embodiment, the sensor array comprises half loop (or U-shaped) sensor segments arranged in an overlapping parallel array. In a further embodiment, the sensor array comprises full loop sensor segments arranged in an overlapping parallel array.

BRIEF DESCRIPTION OF THE DRAWINGS

For a fuller understanding of the nature and advantages of the invention, as well as the preferred mode of use, reference should be made to the following detailed description read in conjunction with the accompanying drawings. In the following drawings, like reference numerals designate like or similar parts throughout the drawings.

FIGS. 5A to 5C are schematic representations of sensor arrays for X and Y coordinates, in accordance with one embodiment of the present invention.

FIGS. 8A to 8C are schematic representations of sensor arrays in accordance with yet another embodiment of the present invention.

DETAILED DESCRIPTION

The present description is of the best presently contemplated mode of carrying out the invention. This description is made for the purpose of illustrating the general principles of the invention and should not be taken in a limiting sense. The scope of the invention is best determined by reference to the appended claims. This invention has been described herein in reference to various embodiments and drawings. It will be appreciated by those skilled in the art that variations and improvements may be accomplished in view of these teachings without deviating from the scope and spirit of the invention.

The present invention overcomes the drawback of the prior art electromagnetic digitizers by providing a novel structure for the sensor segments in the sensor array. The sensor segment structure may be advantageously adapted for integration into the display module of a display device. By way of illustration and not limitation, the present invention will be described in connection with a flat panel display device having an LCD module as the display module, which relies on LC elements as the display elements that can be controlled to render an image. As will be evident from the disclosure below, the electromagnetic digitizer of the present invention may be incorporated in other types of display devices, flat panel or otherwise, having display modules comprising other types of display elements, such as cathode ray tubes (CRT), organic light emitting diode light emitting elements (OLED), field emission display (FED) elements plasma light emitting elements, fluorescence light emitting elements, chemiluminescent light emitting elements, and other types of light emitting elements. The reference to "flat panel" displays herein includes displays having rigid, semi-rigid and flexible substrates and/or panels.

Figure 2:
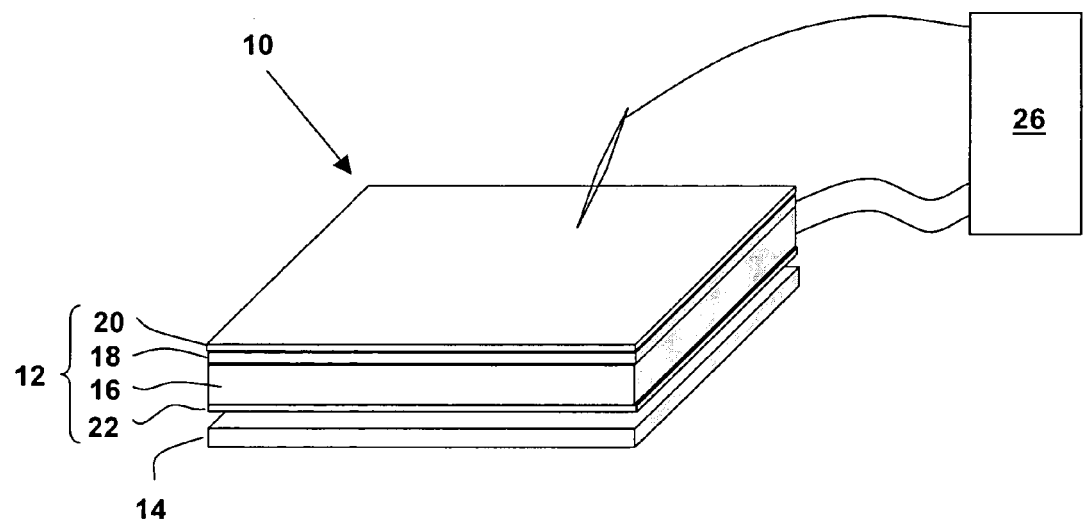
FIG. 2 is a schematic representation of a display device, including a display module incorporating the inventive electromagnetic digitizer, in accordance with one embodiment of the present invention.

FIG. 2 illustrates a flat panel type display device 10 in accordance with one embodiment of the present invention, which includes an LCD module 12, and a backlight module 14 optically coupled to the LCD module 12. The LCD module 12 includes an LC layer 16, supported between two substrates 20 and 22, which can be controlled to regulate and/or filter light transmission to render a composite image based on pixilated image elements. Additional components have been omitted from FIG. 2, to simplify the structure for purpose of disclosing the inventive concept. For example, typically there are layers such as electrode layers, pixel transistor layers (e.g., an array of TFTs, corresponding to display pixels), masking layers, LC alignment layers, color filter layers, and reflection layers within the LCD module 12, and other layers such as diffuser layers, brightness enhancement layers and protective layers, which are position relative to the LCD module 12 within display device 10, which have been omitted for the sake of simplicity. Such layers in and by themselves are well known in the art, and will not be elaborated herein. The backlight module 14 may comprise a light source (not shown) that is positioned at an edge or at a planar side. In operation of the LCD module 10, light from the backlight module 14 is regulated, modulated and/or filtered by the LC layer, to render an image in accordance with an image data. A controller 26 controls the operation of the LCD module 10 (i.e., effecting control of the LC layer 16 via electrodes and drivers (not shown)). The controller 26 may be a part of the display device 10, and/or a part of a computing device to which the display device 10 is operatively attached.

Figure 1:
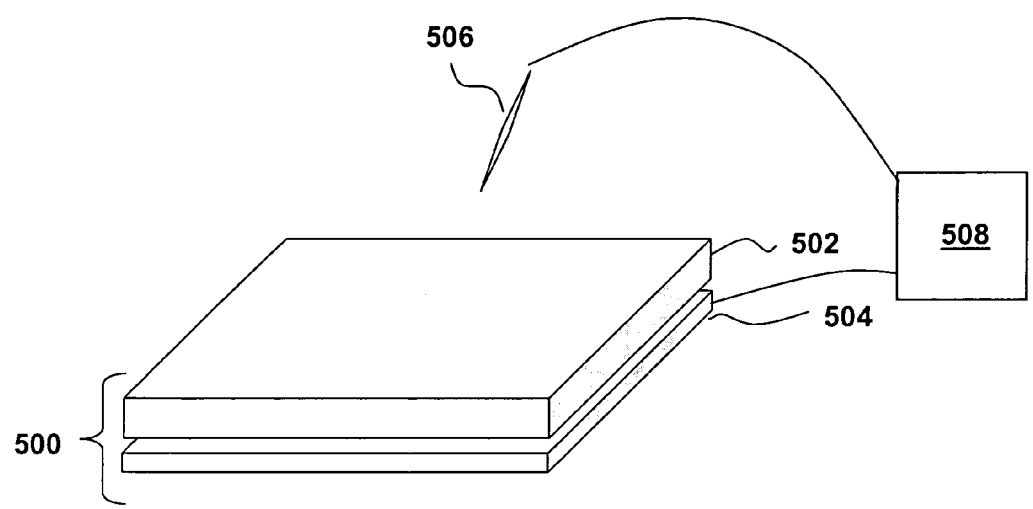
FIG. 1 is a schematic representation of a conventional flat panel display.

According to one embodiment of the present invention, an electromagnetic digitizer 18 having the novel sensor segment structure of the present invention is supported between the LC layer 16 and the substrate 20, which is operatively coupled to the controller 26. Alternatively, the digitizer 18 may be positioned at other locations within the LCD module 12, for example between the LC layer 16 and the substrate 22, or at another intermediate layer location between the substrates 20 and 22 of the LCD module 12. As can be appreciated, the digitizer 18 is integrated into the layers of the LCD module 12 of the display device 10, as opposed to the prior art display devices in which the digitizer panel is provided as a separate component outside the display module (e.g., outside the substrates of the LCD module as shown in FIG. 1). The overall size of the display device 10 is therefore reduced.

To complement the operation of the electromagnetic digitizer 18, a stylus 24 (e.g., in the shape of a pen) is provided. The stylus 24 is operatively coupled to the controller 26, either wirelessly or by a wire. The stylus 24 may include one or more button switches, which may be used to select certain input related modes or functions when pressed by a user (e.g., handwriting recognition mode, point and click mode, etc.) The stylus includes a magnetic element, which may be a permanent magnet or an electromagnet. As the stylus is moved across the substrate 20, its relative positional coordinates can be determined by the controller 26, based on a change in magnetic flux detected by the sensor segments within the electromagnetic digitizer. The basic operational principles of electromagnetic digitizers are well known in the art, and such would not be necessary to be disclosed here.

The controller 26 controls and synchronizes the operations of the display module 12 including the digitizer, and the stylus. Images are controlled to be displayed by the display module 12, which may require user input by using the stylus to interact with the displayed image (e.g., making a selection by tapping on the display module, drawing or handwriting input by moving the stylus on the display module). Reference is made to copending U.S. patent application Ser. No. 11/311,986, filed Dec. 20, 2005, which has been commonly assigned to the assignee of the present invention, for further disclosure of the implementation of an electromagnetic digitizer within a display module such as an LCD module, and the control thereof. Further, reference is also made to concurrently filed U.S. patent application Ser. No. 11/490,835, directed to a process of integrating an electromagnetic digitizer within a display module, such as an LCD module.

Figure 3:
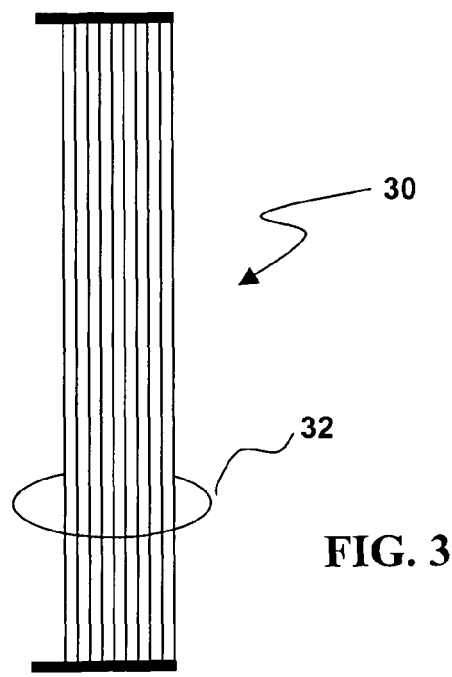
FIG. 3 is a schematic representation of a sensor segment, in accordance with one embodiment of the present invention.

In one aspect of the present invention, the sensor segment of the electromagnetic digitizer 18 comprises a generally longitudinal structure that includes a network of conductive lines, traces or wires. FIG. 3 illustrates the general structure of one embodiment of a sensor segment 30, in accordance with one embodiment of the present invention. The sensor segment 30 includes a network of a plurality of parallel conductive lines 32. The number of parallel lines depends on the signal sensitivity desired and the overall width of the sensor segment 30, which may vary between two to two hundred lines. The width of each trace 32 may range on the order of about 500 nm to 500 micrometers. The spacing between the lines 32 may range on the order of about 10 micrometers to 20 micrometers. The thickness of the lines 32 may range on the order of about 50 nm to 10 micrometers. The appropriate dimensions of the conductive lines 32 may be selected depending on factors such as the size of the display area of the display module 12, the desired spatial resolution, pixel density, available areas and locations for placement of the sensor segments within the LCD module 12, etc. The overall width of the sensor segment 30 may be wide enough to correspond to the distance across several display pixels (e.g., the traces 32 are spaced apart to cover a distance corresponding to several display pixels).

While FIG. 3 illustrates the spacing to be similar for each pair of adjacent lines 32, such spacing may vary between different pairs of adjacent lines 32 (not shown).

Figures 4A, 4B, 4C:
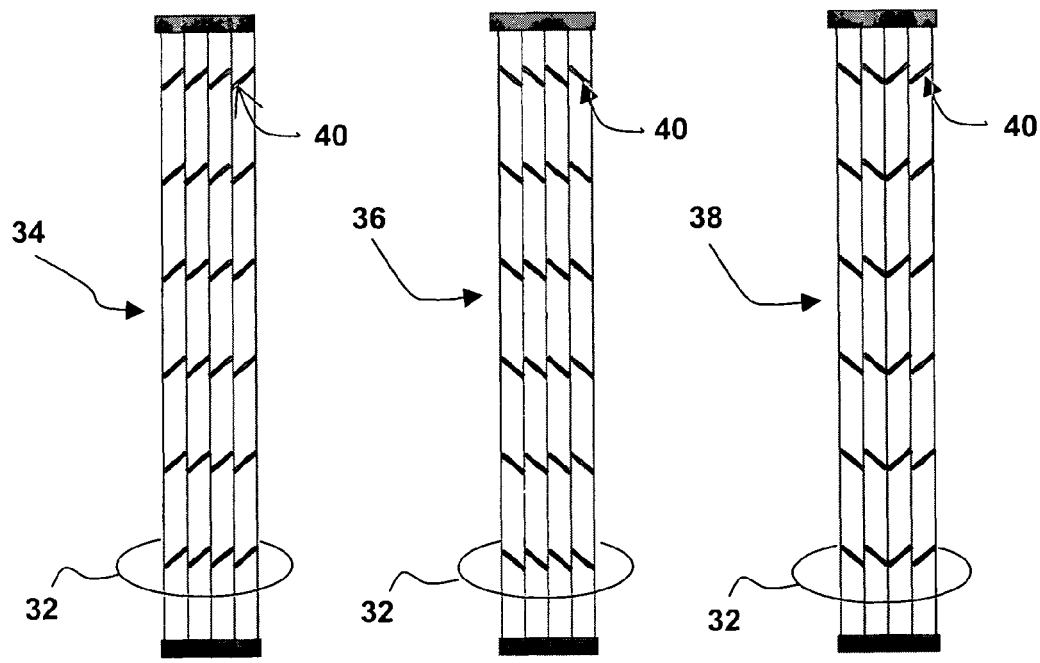
FIGS. 4A to 4C are schematic representations of sensor segments, in accordance with additional embodiments of the present invention.

To further enhance the sensitivity to induced magnetic signals, interconnections are provided between adjacent lines, to form an interconnecting network, resembling a somewhat honeycomb-like structures. Referring to FIGS. 4A to 4C, various embodiments of sensor segments 34, 36 and 38 are illustrated, which are essentially the sensor segment 30 in FIG. 3, provided with interconnections 40 at one or more locations along the generally longitudinal sensor segment structure. The interconnections 40 may be in the form of short or shunt lines, oriented at an angle between adjacent parallel lines 32. All the interconnections 40 along and between the same pair of adjacent longitudinal lines 32 may be at the same angle and/or orientation (as shown in FIGS. 4A to 4C), or at different or mixed angles and/or orientations (not shown; e.g., in a zigzag fashion along the pair of adjacent lines 32). All the interconnections 40 for all the pairs of adjacent lines 32 may be at the same angle and/or orientation, as in the embodiments of FIGS. 4A and 4B, or some of the pairs of adjacent lines 40 may have interconnections 40 at different or mixed angles and/or orientations. The angle that an interconnection 40 makes with respect to a trace 32 is preferably not perpendicular (e.g., greater than 0 degree, and less than 90 degrees, and is preferred to be small), to provide a longer interconnection for a particular spacing between a pair of adjacent lines 32. In general, the electromagnetic sensitivity of the sensor segments is increased with an increase in available length of the lines within the network in the sensor segment.

In another aspect of the present invention, the sensor segments are miniaturized, so that they can be integrated into the display module using semiconductor fabrication processes (i.e., formed into one or more layers within the display module (e.g., between the display element 16 and substrate 20 or substrate 22), as opposed to attached to the outside of the display module as practiced in the prior art). The details of the steps in these processes have been omitted, as they may involve conventional patterning and photolithographic steps well known in semiconductor processing, such as masking, exposure, doping, deposition, etching, etc., to form structures having desired patterns and conductive properties (including the digitizer sensor arrays). Given the network of conductive lines in the sensor segments, the sensitivity of the sensor array can be maintained at a desired level even with significantly smaller overall dimension of the sensor segments. Accordingly, a display module can effectively be provided with integrated sensor arrays, thereby reducing the size of the display module.

The miniaturized sensor segments facilitates integration of electromagnetic digitizers within display modules such as LCD modules, in accordance with the inventive concept disclosed in copending U.S. patent application Ser. No. 11/311,986, filed Dec. 20, 2005, which has been commonly assigned to the assignee of the present invention. The process of integrating electromagnetic digitizers within display modules such as LCD modules may be referenced to concurrently filed U.S. patent application Ser. No. 11/490,835, directed to a process of integrating an electromagnetic digitizer within a display module, such as an LCD module.

In another aspect of the present invention, various sensor array structures that incorporate the novel sensor segment structures are used to configure the electromagnet digitizer, which is suited for integration into display modules such as LCD modules. FIG. 5A illustrates the embodiment of a sensor array 46, which comprises longitudinal sensor segments 50 arranged in a parallel array. The sensor segments 50 include sensor segments that have a generally longitudinal structure that includes a network of conductive lines, traces or wires, disclosed above in accordance with the present invention. For example, the sensor segments 50 may have one or more of the structures of sensor segments 30, 34, 36 and 38 shown in FIGS. 3, 4A, 4B and 4C, respectively. The number of sensor segments 50 would depend on the resolution and/or sensitivity desired to be achieved. In the particular illustrated embodiment, the sensor segments 50 comprise eight segments A1 to A8, arranged in a parallel array. The segments A1 to A8 may have the same sensor segment structure or different sensor segment structures. For example, segments A1 to A8 may each have a structure similar to the sensor segment 34 disclosed in FIG. 4A, or segments A1, A3, A5, A7 and A2, A4, A6, A8 may alternate between the structures of the sensor segments 34 (FIG. 4A) and 36 (FIG. 4B), etc. The choice of the particular sensor segment structure would depend on the sensitivity and/or resolution desired to be achieved. The overall width of each sensor segment 50 may be wide enough to correspond to the distance across several pixels.

As schematically illustrated in FIG. 5A, the parallel sensor segments 50 are operatively coupled to a controller or processor 48. One end of each sensor segment 50 is connected in common to ground and/or a terminal of the processor 48. Another end of each segment 50 is connected to another set of terminals of a processor 48. The processor 48 "scans" each sensor segment 50 in sequence to determine which sensor segment has experienced a change in current caused by a change in magnetic induction in the presence of the stylus 24. FIG. 5A represents an X-array, allowing determination of the X-position of the stylus 24 across the sensor array 46.

To complement the sensor array 46, FIG. 5B represents a sensor array 54, which functions as a Y-array, allowing determination of the Y-position of the stylus 24. The sensor array 54 may be similar in structure to the sensor array 46 in FIG. 5B. The sensor array 54 comprises longitudinal sensor segments 52 arranged in a parallel array. The sensor segments 52 include sensor segments that have a generally longitudinal structure that includes a network of conductive lines, traces or wires, disclosed above in accordance with the present invention. As for the sensor array 46, the sensor segments 52 may have one or more of the structures of sensor segments 30, 34, 36 and 38 shown in FIGS. 3, 4A, 4B and 4C, respectively. In the particular illustrated embodiment, the sensor segments 52 comprise eight segments B1 to B10, arranged in a parallel array. The segments B1 to B10 may have the same sensor segment structure or different sensor segment structures. For example, segments B1 to B10 may each have a structure similar to the sensor segment 34 disclosed in FIG. 4A, or segments B1, B3, B5, B7, B9 and B2, B4, B6, B8, B10 may alternate between the structures of the sensor segments 34 (FIG. 4A) and 36 (FIG. 4B), etc.

As schematically illustrated in FIG. 5B, the parallel sensor segments 52 are operatively coupled to a controller or processor 56. One end of each sensor segment 52 is connected in common to ground and/or a terminal of the processor 56. Another end of each segment 52 is connected to another set of terminals of the processor 56. The processor 56 "scans" each sensor segment 52 in sequence to determine which sensor segment has experienced a change in current caused by a change in magnetic induction in the presence of the stylus 24.

The sensor arrays 46 and 54 are stacked in a spaced apart configuration, in an orthogonal manner, as schematically shown in FIG. 5C, to form the complete electromagnetic digitizer 18, which may be implemented on the inside surface of the top substrate 20, as shown in FIG. 2. The two sensor arrays 46 and 54 may be separated by a dielectric material (not shown in the simplified view in FIG. 5C), in a thickness, for example, ranging between 5 to 10000 nm. The sensor arrays 46 and 54 may be commonly grounded by interconnecting at 58 the grounding ends of the sensor segments in the sensor arrays through a via in the dielectric material (not shown). The sensor arrays 46 and 54 are operatively coupled to the controller 26, which includes the X-processor 48 and Y-processor 56. Further, the X-processor 48 and Y-processor 56 may be a single processor having dual functions for controlling X sensor array 46 and Y sensor array 54.

It is noted that the X sensor array 46 and the Y sensor array 54 do not need to have sensor segments that each have a network of conductive lines in accordance with the present invention. For example, the X sensor array 46 may have sensor segments each having a network of conductive lines in accordance with the present invention, but the Y sensor array 54 may have sensor segments that each has a single wire structure found in the prior art, or vice versa. In other words, the X sensor array and the Y sensor array may be mixed and matched with different types of sensor segment structures for the respective sensor arrays.

Figure 6:
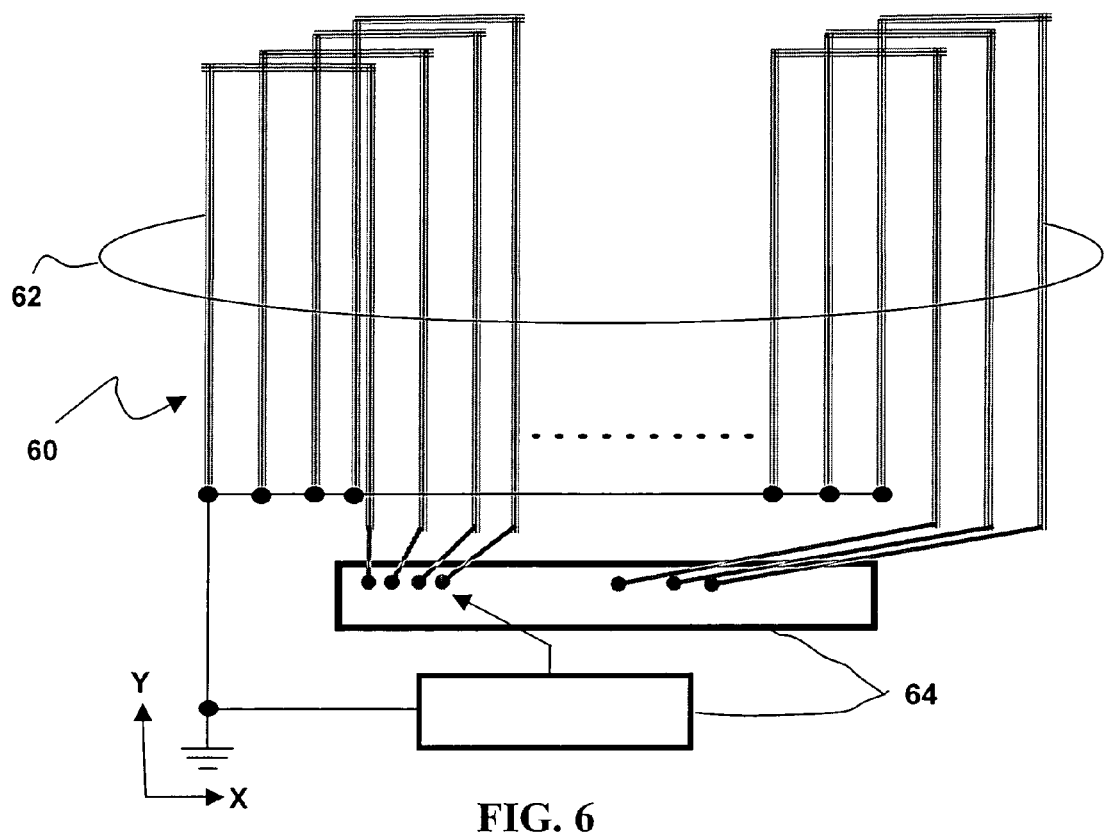
FIG. 6 is a schematic representation of a sensor array in accordance with another embodiment of the present invention.

FIG. 6 schematically illustrates another embodiment of a sensor array 60, which comprises half loop or U-shaped sensor segments 62 arranged in an overlapping parallel array. The overlapping U-shaped sensor segments 62 are separated by dielectric layers (not shown), such that that the U-shaped sensor segments 62 are electrically insulated from one another. The U-shaped sensor segments 62 include segments that have a generally longitudinal structure that includes a network of conductive lines, traces or wires, disclosed above in accordance with the present invention. The U-shaped sensor segments 62 may have one or more of the structures of sensor segments 30, 34, 36 and 38 shown in FIGS. 3, 4A, 4B and 4C, respectively. The parallel-connected sensor segments 62 are operatively coupled to a controller or processor 64. One end of each U-shaped sensor segment 62 is connected in common to ground and/or a terminal of the processor 64. Another end of each U-shaped sensor segment 62 is connected to another set of terminals of the processor 64. The processor 64 "scans" each U-shaped sensor segment 62 in sequence to determine which sensor segment has experienced a change in current caused by a change in magnetic induction in the presence of the stylus 24. FIG. 6 represents an X-array, allowing determination of the X-position of the stylus 24 across the sensor array 60.

As in the previous embodiment, to complement the X sensor array 60, a Y sensor array (not shown) is provided to allow determination of the Y-position of the stylus 24. The Y sensor array may have an array configuration and sensor segments that are similar in structure to those in the sensor array 60 in FIG. 6, but with the longitudinal sensor segments configured orthogonal to the longitudinal segments 62. Alternatively, the Y sensor array may take on a configuration similar to the Y sensor 54 in FIG. 5B. Further, the Y sensor array may have sensor array and sensor segments that are similar to conventional sensor array and sensor segment. The X sensor array 60 and the Y sensor array (not shown) are stacked in a spaced apart configuration, in an orthogonal manner, as in the previous embodiment schematically shown in FIG. 5C, to form a complete electromagnetic digitizer 18.

Figure 7:
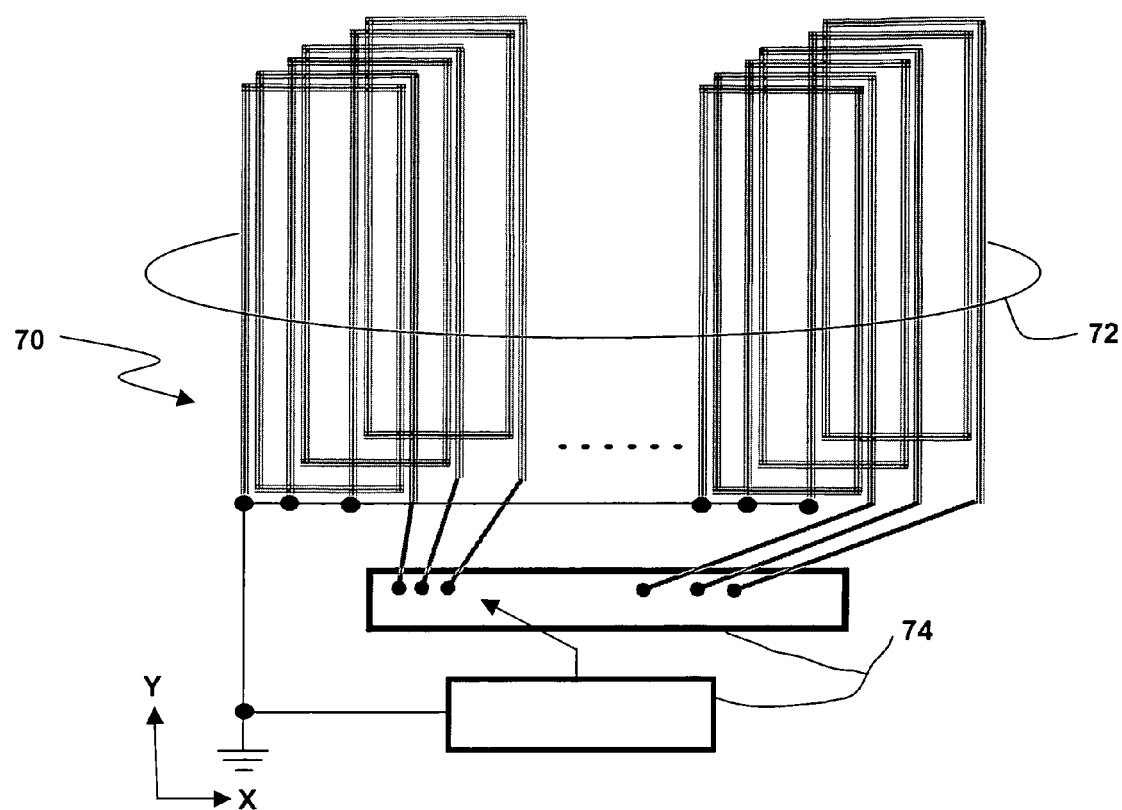
FIG. 7 is a schematic representation of a sensor array in accordance with a further embodiment of the present invention.

In a further embodiment illustrated in FIG. 7, the sensor array 70 comprises full loop sensor segments 72 arranged in an overlapping parallel array. As referenced herein, each full loop sensor segment is not in a closed loop, but in a spiral loop. In the illustrated embodiment, each full loop sensor segment spirals counterclockwise in a direction into the X-Y plane (i.e., in the −Z direction). (In another embodiment, each full loop sensor segment could spiral clockwise, in a direction into the X-Y plane (i.e., in the −Z direction). The overlapping full loop sensor segments 72 are separated by dielectric layers (not shown), such that the full loop sensor segments 72 are electrically insulated from one another. Further, overlapping sections within a full loop sensor segment are also separated by a dielectric layer.

The full loop sensor segments 72 include segments that have a generally longitudinal structure that includes a network of conductive lines, traces or wires, disclosed above in accordance with the present invention. The full loop sensor segments 72 may have one or more of the structures of sensor segments 30, 34, 36 and 38 shown in FIGS. 3, 4A, 4B and 4C, respectively. The parallel-connected sensor segments 72 are operatively coupled to a controller or processor 74. One end of each full loop sensor segment 72 is connected in common to ground and/or a terminal of the processor 74. Another end of each U-shaped sensor segment 72 is connected to another set of terminals of the processor 74. The processor 74 "scans" each U-shaped sensor segment 72 in sequence to determine which sensor segment has experienced a change in current caused by a change in magnetic induction in the presence of the stylus 24. FIG. 7 represents an X-array, allowing determination of the X-position of the stylus 24 across the sensor array 70.

As in the previous embodiments, to complement the X sensor array 70, a Y sensor array (not shown) is provided to allow determination of the Y-position of the stylus 24. The Y sensor array may have an array configuration and sensor segments that are similar in structure to those in the sensor array 70 in FIG. 7, but with the longitudinal sensor segments configured orthogonal to the longitudinal segments 72. Alternatively, the Y sensor array may take on a configuration similar to the Y sensor 54 in FIG. 5B, or a configuration similar to the X sensor array 60 in FIG. 6 (but arranged in an orthogonal manner). Further, the Y sensor array may have sensor array and sensor segments that are similar to conventional sensor array and sensor segment. The X sensor array 60 and the Y sensor array (not shown) are stacked in a spaced apart configuration, in an orthogonal manner, separated by a dielectric layer, as in the previous embodiment schematically shown in FIG. 5C, to form a complete electromagnetic digitizer 18.

To further enhancing sensitivity of the sensor arrays, additional sensor lines or traces may be provided between adjacent longitudinal sensor segments. FIG. 8A shows a sensor array 80 that includes a similar structure as the X sensor array 46 in FIG. 5A, having sensor segments 50, and further additional sensor lines 82 between adjacent sensor segments 52. The additional sensor segments 82 may have one or more of the structures of sensor segments 30, 34, 36 and 38 shown in FIGS. 3, 4A, 4B and 4C, respectively. The additional sensor lines 82 may be at the same voltage potential (e.g., connected to a fixed reference voltage or ground), or electrically isolated or floating. An X processor 84 is operatively coupled to the sensor array 80.

The X sensor array 80 may be used with a Y sensor array that can take a structure similar to the sensor array 54 in FIG. 5B, or the configuration similar to the X sensor array 60 in FIG. 6, or the X sensor array 70 in FIG. 7 (but arranged in an orthogonal manner). Alternatively, the Y sensor array may take on a structure similar to the X sensor array 80 in FIG. 8, but arranged in an orthogonal manner, as shown in FIG. 8B. The Y sensor array 86 is essentially the sensor array 54 in FIG. 5B, with further additional sensor lines 88 in between adjacent sensor segments 52. The additional sensor segments 88 may have one or more of the structures of sensor segments 30, 34, 36 and 38 shown in FIGS. 3, 4A, 4B and 4C, respectively. The additional sensor lines 88 may be at the same voltage potential (e.g., connected to a fixed reference voltage or ground), or electrically isolated or floating. The Y sensor array 86 is operatively coupled to a Y processor 89.

Figure 8C:
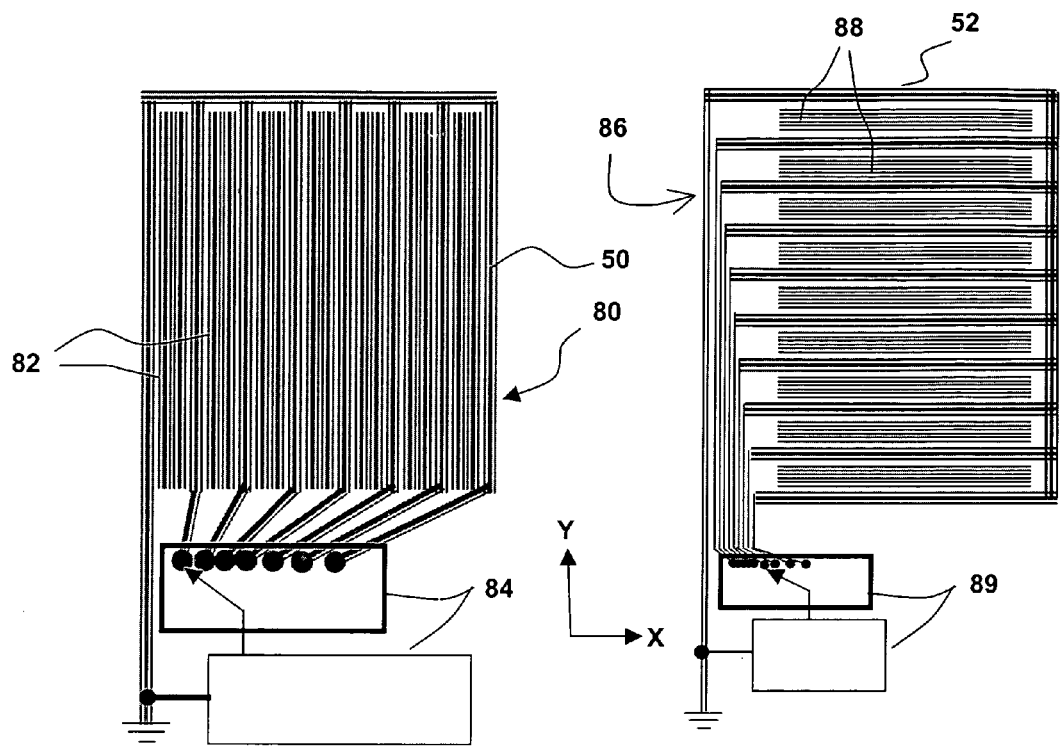
Figure 8C:
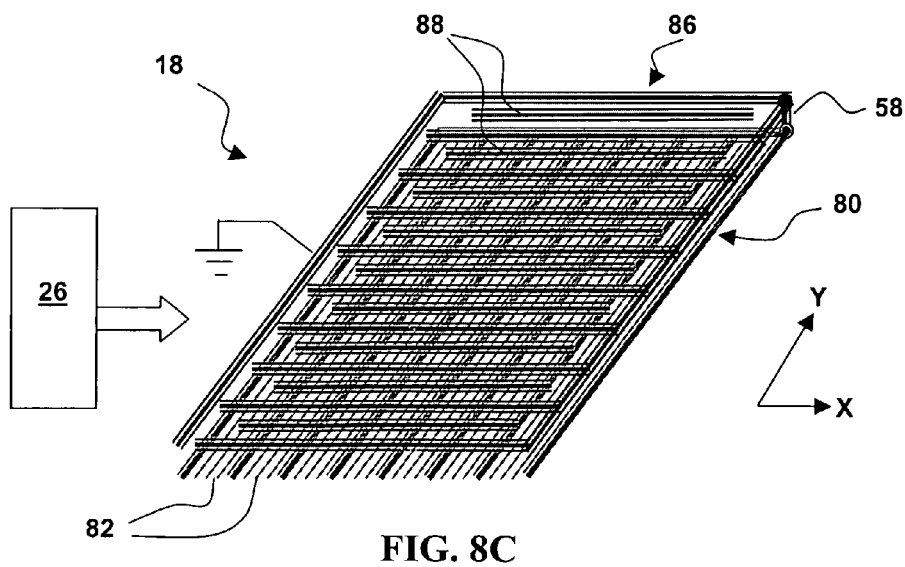

Referring to FIG. 8C, the X sensor array 80 and the Y sensor array 86 are stacked in a spaced apart configuration, in an orthogonal manner, separated by a dielectric layer, as in the previous embodiment schematically shown in FIG. 5C, to form a complete electromagnetic digitizer 18. The sensor arrays 80 and 86 may be commonly grounded by interconnecting at 58 the grounding ends of the sensor segments in the sensor arrays through a via in the dielectric material (not shown). The sensor arrays 80 and 86 are operatively coupled to the controller 26, which includes the X-processor 84 and Y-processor 89. Further, the X-processor 84 and Y-processor 89 may be a single processor having dual functions for controlling X sensor array 80 and Y sensor array 86.

It can be appreciated that the configurations of the sensor arrays shown in FIGS. 5, 6, 7 and 8 may be mixed and combined in a single sensor array, without departing from the scope and spirit of the present invention. Depending on the particular application of the electromagnetic digitizer, by combining different sensor array components over the entire digitizer planar area (e.g., using parallel straight sensor segments at certain area of the digitizer, using parallel half-loop sensor segments in another area of the digitizer, using parallel full looped sensor segments in a further area of the digitizer, and using additional floating conductive lines between adjacent sensor segments in yet another area of the digitizer), different desired sensitivities may be achieved at different areas of the digitizer. For example, for a PDA or a tablet PC incorporating a flat panel display system that includes an electromagnetic digitizer in accordance with the present invention, the sensitivity at certain areas of the display (e.g., areas display certain defined or fixed icons for user selection, such as "soft" keys) may not be required to be as high as the sensitivity at another area of the display (e.g., the area designated for hand writing recognition).

Figure 9:
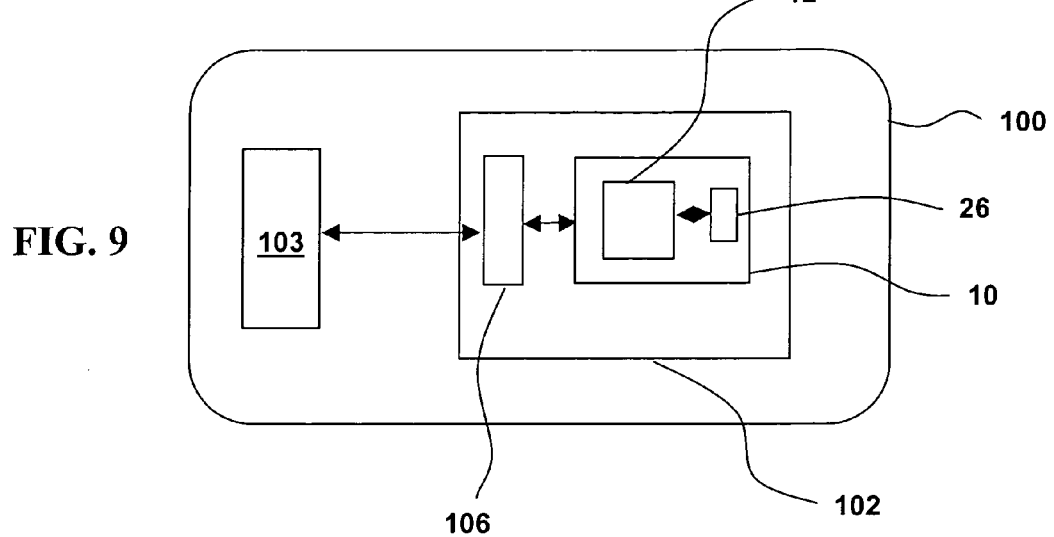
FIG. 9 is a schematic representation of an electronic device incorporating the display device in accordance with one embodiment of the present invention.

FIG. 9 schematically shows an embodiment of an electronic device 100, which includes a display system 102 for displaying images, and an input/output (I/O) controller 103 for providing image data to the display system 102 and instructing the display system 102 to render an image in accordance with the image data. The display system 102 includes the display device 10 (e.g., an LCD device) in accordance with the present invention and an interface controller 106 exchanging image data and user input data (from the digitizer 18) with the I/O controller 103. The display device incorporates a display module (e.g., an LCD module) having an integrated electromagnetic digitizer 18 of the present invention and a controller 26 (e.g., drivers). The electronic device 100 may include a laptop computer, a mobile phone, a digital camera, a personal digital assistant (PDA), a desktop computer, a television, a car display or a portable DVD player.

While particular embodiments of the invention have been described herein for the purpose of illustrating the invention and not for the purpose of limiting the same, it will be appreciated by those of ordinary skill in the art that numerous variations of the details, materials, and arrangements of parts may be made without departing from the scope of the invention as defined in the appended claims.

What is claimed is:

1. A sensor array for an electromagnetic digitizer, comprising a plurality of sensor segments, each having a generally longitudinal structure that includes a network of at least two conductive lines spaced apart along a longitudinal direction, wherein adjacent conductive lines are interconnected by a plurality of interconnection lines at a plurality of locations along the conductive lines other than at the ends of the conductive lines, and wherein the interconnection lines are shunt lines shorting the adjacent conductive lines at the plurality of locations.

2. A sensor array as in claim 1, wherein the conductive lines are spaced apart in parallel.

3. A sensor array as in claim 2, wherein the conductive lines are commonly coupled at one end.

4. A sensor array as in claim 3, wherein the conductive lines are commonly grounded at said one end.

5. A sensor array as in claim 1, wherein adjacent conductive lines are interconnected by at least two interconnection lines at least two locations along the conductive lines other than at the ends of the conductive lines.

6. A sensor array as in claim 5, wherein the interconnection lines are at an angle to the adjacent conductive lines.

7. A sensor array as in claim 1, wherein the network of conductive lines is configured in a generally honeycomb structure.

8. A sensor array as in claim 1, wherein the sensor segments are arranged in parallel.

9. A sensor array as in claim 8, wherein at least two of the sensor segments include parallel longitudinal sections.

10. A sensor array as in claim 9, further comprising additional conductive lines disposed between adjacent parallel longitudinal sections of sensor segments.

11. A sensor array as in claim 10, wherein the additional conductive lines are maintained at the same electrical potential.

12. A sensor array as in claim 8, wherein at least two of the sensor segments include generally half-looped or U-shaped sections, or generally full looped sections.

13. A sensor array as in claim 12, wherein the half looped or U-shaped sections or full looped sections are configured in an overlapping manner separated by a dielectric material.

14. An electromagnetic digitizer, comprising:
a first sensor array for determining a first coordinate of a stylus input in a first direction;
a second sensor array for determining a second coordinate of a stylus input in a second direction orthogonal to the first direction,
wherein at least one of the first sensor array and the second sensor array is as claimed in claim 1.

15. An electromagnetic digitizer as in claim 14, further comprising a controller operatively coupled to the first sensor array and the second sensor array to determine the first and second coordinates based on changes in current induced by changes in magnetic flux at the first and second sensor arrays.

16. A display device, comprising:
a display module, which comprises:
a display element; and
an electromagnetic digitizers as claimed in claim 14; and
a controller operatively coupled to the display module including the electromagnetic digitizer, to synchronize operation of the display element and the electromagnetic digitizer.

17. A display device as in claim 16, further comprising a stylus operatively coupled to the controller.

18. A display system, comprising:
a display device as in claim 16; and
an interface controller coupled to the display device, exchanging image data and user input data from the electromagnetic digitizer with a controller in an electronic device.

19. An electronic device, comprising:
a display system as in claim 18; and
a controller operatively coupled to the interface controller of the display system, to exchange image data and user input data from the electromagnetic digitizer.

20. A sensor array as in claim 5, wherein the at least two interconnection lines are at the same angle with respect to the adjacent conductive lines.

* * * * *